United States Patent [19]
Seiple

[11] Patent Number: 5,915,711
[45] Date of Patent: Jun. 29, 1999

[54] BICYCLE TRAINING DEVICE

[76] Inventor: Steven J. Seiple, 7589 Forest Knoll Dr., Dublin, Ohio 43017

[21] Appl. No.: 09/100,702

[22] Filed: Jun. 19, 1998

[51] Int. Cl.⁶ ........................................... B62H 7/00
[52] U.S. Cl. ................................................ 280/293
[58] Field of Search ................................ 280/293, 288.4, 280/304.5

[56] References Cited

U.S. PATENT DOCUMENTS

| D. 377,634 | 1/1997 | DeLeo | D12/114 |
|---|---|---|---|
| 2,672,351 | 3/1954 | Kane | 280/288.4 |
| 5,154,096 | 10/1992 | Geller et al. | 280/293 |
| 5,259,638 | 11/1993 | Krauss et al. | 280/293 |
| 5,501,479 | 3/1996 | Fehrenbach et al. | 280/293 |
| 5,564,726 | 10/1996 | Hearn et al. | 280/293 |
| 5,577,750 | 11/1996 | Sklar | 280/288.4 |

FOREIGN PATENT DOCUMENTS

| 2238282 | 5/1991 | United Kingdom | 280/288.4 |
|---|---|---|---|
| 2263133 | 7/1993 | United Kingdom | 280/288.4 |

*Primary Examiner*—Kevin Hurley
*Assistant Examiner*—William R. Zimmeru
*Attorney, Agent, or Firm*—Standley & Gilcrest

[57] ABSTRACT

The present invention is directed to a bicycle bearing a training support device. A preferred embodiment of the bicycle generally comprises: a rear wheel fork comprising two rear wheel fork bars; and a training support bar having a handle. The training support bar is attached to the two rear wheel fork bars by an attachment. The attachment comprises an attachment flange which is adapted to engage the two rear wheel fork bars in an attachment position. The attachment flange is attached to the training support bar at an attachment point, and the attachment flange has two pairs of slots which are each adapted to accept a U-bolt closure. Each pair is disposed so as to accord with the position of a respective one of the two rear wheel fork bars. Each pair of slots is also arranged such that one slot extends on one side of the respective rear wheel fork bar, and the other slot extends on the other side of the respective rear wheel fork bar. In addition to the attachment flange, the attachment comprises a U-bolt closure fitted through each of the pairs of slots so as to hold the two rear wheel fork bars against the attachment flange.

2 Claims, 5 Drawing Sheets

BICYCLE TRAINING DEVICE

BACKGROUND OF THE INVENTION

The present invention relates generally to a bicycle training device, and more particularly, to a stabilizing bar used for training a novice to ride a two-wheel bicycle. Without the aid of a bicycle training device, the supervising trainer has to assume an awkward bending position in order to support the novice bike rider. In particular, the supervising trainer has to bend over to grip the novice bike rider or some portion of the bike, usually the seat. In addition, the supervising trainer usually must have one hand on the handle bar in order to help steer the bicycle. All the while, the supervising trainer must jog alongside the bicycle in order to give the novice bike rider the sensation of riding the bicycle.

As a result of the awkward bending position, several problems may develop for the supervising trainer who is assisting in the learning process. The awkward bending position may lead to back strain which limits the supervising trainer's ability to assist the novice. In addition, the supervising trainer may be prone to stumble while in the awkward bending position. Consequently, learning to ride a two-wheel bicycle without an appropriate bicycle training device may be hazardous for both the supervising trainer and the novice.

In addition, the awkward bending position hinders the learning process. In particular, the control exerted by the supervising trainer while in the awkward bending position substantially limits the novice's ability to guide the bike. As a result, it takes longer for the novice to overcome the fear of falling.

Various bicycle training devices have been offered as a solution to some or all of the above-mentioned problems. Generally, the earlier designs comprise one or all of the following features: (1) a mounting mechanism for a pole comprised of two plates which are compressed together by a single bolt; (2) a mounting mechanism for a pole which is not adapted to fit varying widths of upper rear forks; (3) a mounting mechanism that utilizes a seat tube as an attachment point for a stabilizing bar; (4) a pole which is attached to the mounting mechanism by threaded extensions; (5) a flexible pole attached to the rear of the bicycle; (6) a pole attached to the rear of the bicycle which is too short for the supervising trainer to visually monitor the side-to-side motion of the pole; (7) a pole attached to the rear of the bicycle which is not substantially vertically oriented; or (8) a pole attached to the rear of the bicycle which extends beyond the rear axle of the bicycle. The earlier designs, however, are inadequate for at least one of several reasons.

The mounting mechanisms of earlier designs have several shortcomings. For instance, a mounting mechanism for a pole comprised of two plates which are compressed together by a single bolt is unsafe. Any loosening of the single bolt could allow a sudden and total release of the mounting mechanism from the bicycle. On the other hand, a mounting mechanism that utilizes the seat tube as an attachment point for a stabilizing bar prevents the bicycle seat from being placed in its lowest position. Finally, a mounting mechanism for a pole which is not adapted to fit varying widths of upper rear forks does not allow mounting on various sizes of bicycle frames.

The poles of earlier designs are also inadequate. For example, a pole which is attached to the mounting mechanism by threaded extensions is impractical for configuring the pole around the seat since any stabilizing force applied to the hand grip may unscrew the clamp. On the other hand, a flexible pole attached to the rear of the bicycle does not give the supervising trainer sufficient control over the bicycle. As a result, a flexible pole makes it very difficult for the supervising trainer to securely stabilize a child who is leaning too far or in the wrong direction. In addition, a pole attached to the rear of the bicycle which is too short for the supervising trainer to visually monitor the side-to-side motion of the pole does not allow the supervising trainer to quickly react when assistance is needed. Furthermore, a pole attached to the rear of the bicycle which is not substantially vertically-oriented presents a real risk of injury to the supervising trainer should the novice stop abruptly. Finally, a pole attached to the rear of the bicycle which extends beyond the rear axle of the bicycle may cause the bicycle to jack-knife. A jack-knife may occur because a force applied to the pole beyond the rear axle creates a moment around the rear tire at the point where the rear tire contacts the ground. The moment around the rear tire may then cause a lateral motion of the front wheel and a sudden jack-knife of the handle bar.

It is, therefore, an object of the present invention to overcome the shortcomings of known bicycle training devices. It is also an object of the present invention to instill confidence in the mind of the novice that he will not fall while learning to ride a bicycle. It is another object of the present invention to allow the novice to experience the feeling of leaning into a turn. It is still another object of the present invention to provide a bicycle training device so that the supervising trainer can safely and comfortably assist with the learning process. It is yet another object of the present invention to provide a bicycle training device which is adapted to fit the majority of the most commonly used two-wheel bicycles. Finally, it is an object of the present invention to provide a bicycle training device which is reasonable priced.

SUMMARY OF THE INVENTION

The present invention is directed to a bicycle bearing a training support device. A preferred embodiment of the bicycle generally comprises: a rear wheel fork comprising two rear wheel fork bars; and a training support bar having a handle. The training support bar is attached to the two rear wheel fork bars by an attachment. The attachment comprises an attachment flange which is adapted to engage the two rear wheel fork bars in an attachment position. The attachment flange is attached to the training support bar at an attachment point, and the attachment flange has two pairs of slots which are each adapted to accept a U-bolt closure. Each pair is disposed so as to accord with the position of a respective one of the two rear wheel fork bars. Each pair of slots is also arranged such that one slot extends on one side of the respective rear wheel fork bar, and the other slot extends on the other side of the respective rear wheel fork bar. In addition to the attachment flange, the attachment comprises a U-bolt closure fitted through each of the pairs of slots so as to hold the two rear wheel fork bars against the attachment flange.

It is preferred that the slots within each of the pairs of slots be disposed at an angle to one another, so as to allow the U-bolt closures to accommodate and tighten upon rear wheel fork bars of varying separation distances. It is also preferred that the bicycle have a rear axle and that the handle be disposed above the rear axle.

The present invention provides a sturdy stabilizing bar mounted vertically over the rear wheel. The bar is easily installed with a single wrench on most standard size kiddie bikes. The unique design of the mounting bracket provides for universal mounting on bicycles with varying upper rear fork widths.

The present invention assists a child who is learning to ride a two-wheeled bicycle. The device is designed to allow a parent or other trainer a comfortable means of holding a child who is learning to ride upright without training wheels. With this bar, the trainer does not need to hunch over holding the child's seat, while trying to walk or jog alongside.

The features and benefits of the present invention in its many embodiments include:

1) Location of Trainer's Hand Grip—The shape of the elongate pole, combined with the unique mounting bracket places the trainers hand grip in an position above the rear axle of the bicycle at a desirable height for the typical trainer (chest height). A lateral stabilizing force applied by the trainer is desired at this point for the following reason: If a stabilizing force is applied at some point behind the rear axle, the stabilizing force applied to the bar creates a moment around the rear tire at the point where it contacts the ground and causes a lateral motion on the front wheel creating a sudden "jack-knife" of the front steering wheel. In addition to being unsafe, it becomes a source of stress for the trainee and destroys the trainee's confidence in the trainer's ability to stabilize the bicycle. This "jackknife" moment would not normally be experienced by a two-wheel bicycle rider. By positioning the hand grip for the trainer over the rear axle, and therefore eliminating any moment arm, a stabilizing force applied by the trainer will not cause a "jackknife" or veering to the side by the front steering wheel.

2) Rigid (Non-Threaded) Attachment of pole to mounting plate—In order for the elongate pole to extend from its mounting plate on the upper rear fork, immediately underneath the rear portion of the bicycle seat, to the desired point above the rear axle, the pole must be configured in a manner that allows it to clear the seat. This offset in the pole requires a mounting method for the elongate bar, in conjunction with its mounting plate that can resist a torque applied around the longitudinal axis of the elongate pole at the point it meets the mounting plate. In essence, the pole becomes a large wrench. Earlier designs utilize threaded extensions to the elongate pole to create a clamp that compresses on the upper fork. These designs would be impractical when configuring the pole around the seat and extending to a point above the rear axle, since any stabilizing force applied to the hand grip would "un-screw" the clamp.

3) Rigidity of Design—Some earlier designs "highlight" their feature of offering a "flexible" pole. Having trained a cautious six-year old to ride a two-wheeler using a stabilizing bar, I would argue that being flexible is not desirable. The trainee, in order to concentrate on learning to ride, must feel secure in the hands of the trainer. A flexible pole makes it very difficult to securely stabilize a child who is leaning too far, or leaning the wrong way. The pole and mount design must be rigid to assert positive control over the rider.

4) Dual U-Bolt Clamp for Mounting Plate—Two (2) independent U-Bolts provide an extra degree of safety and security over earlier designs that rely on a single bolt to provide the compression of two plates. In these earlier designs, any loosening of the single bolt could allow a sudden and total release of the clamp from the bicycle frame.

5) Unique Mounting Plate is Universal—The uniqueness of the custom designed mounting plate allows for mounting of the elongate pole on various sizes of bicycle frames with varying widths of upper rear forks.

6) Mount is independent of and unrelated to seat height—Some earlier designs utilize the seat tube as an attachment point for a stabilizing bar. This method of attachment prohibits the seat from being placed in its lowest position. (Most of the kids in our neighborhood are learning to ride bicycles they can grow into, and therefore need their seats in their lowest position so they can touch the ground when they stop.)

7) Near vertical orientation of pole—The vertical orientation of the pole provides an extra degree of safety for the trainer. Since training involves jogging along side, or immediately behind the bicycle, it is desirable that the pole is not "pointing" out and up at the trainers face and chest. Earlier designs that promote a pole aimed rearward represent a real risk of injury to the trainer should the trainee stop abruptly. In addition, the vertical orientation allows maximum leverage for supporting the trainee's weight.

8) Visual monitoring of stabilizing pole—The height of the pole, combined with its vertical orientation, improves the ability of the trainer to visually observe the side-to-side motion of the bar. The bar's motion represents an amplified view of the trainee's motion, allowing the trainer to react when assistance is needed.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
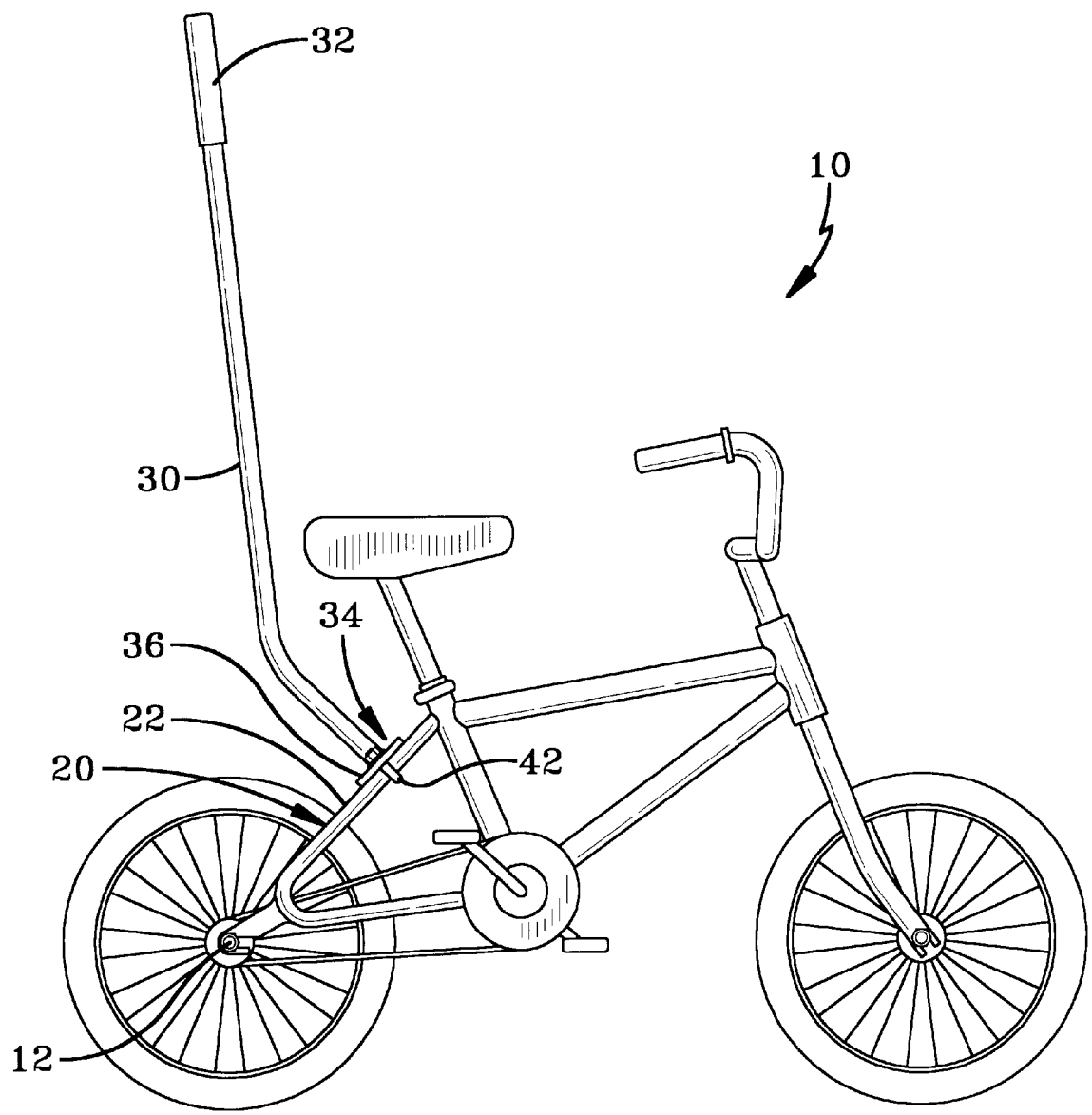
FIG. 1 is a side elevation view of a preferred embodiment of a bicycle bearing a training support device.

The present invention is directed to a bicycle bearing a training support device. FIG. 1 is a side elevation view of a preferred embodiment of the present invention. A preferred embodiment of the bicycle 10 generally comprises: a rear wheel fork 20 comprising two rear wheel fork bars 22, 24; and a training support bar 30 having a handle 32. The training support bar 30 is attached to the two rear wheel fork bars 22, 24 by an attachment 34. The attachment 34 comprises an attachment flange 36 which is adapted to engage the two rear wheel fork bars 22, 24 in an attachment position. The attachment flange 36 is attached to the training support bar 30 at an attachment point.

Figure 2:
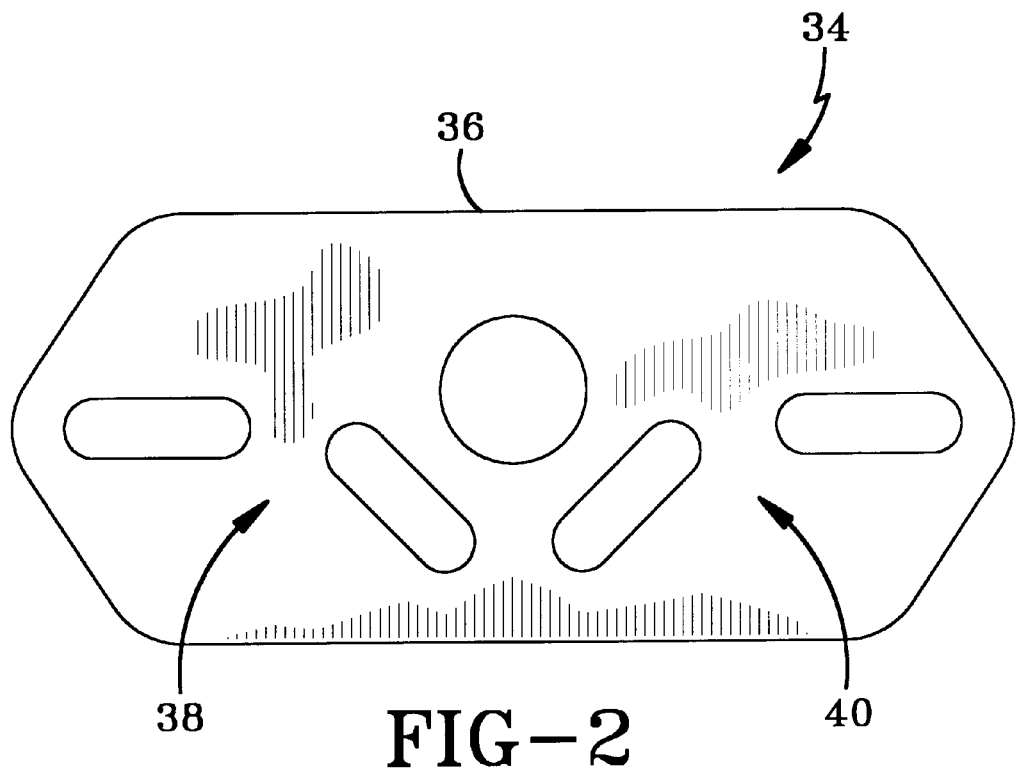
FIG. 2 is a bottom plan view of a preferred embodiment of an attachment flange.
Figure 3:
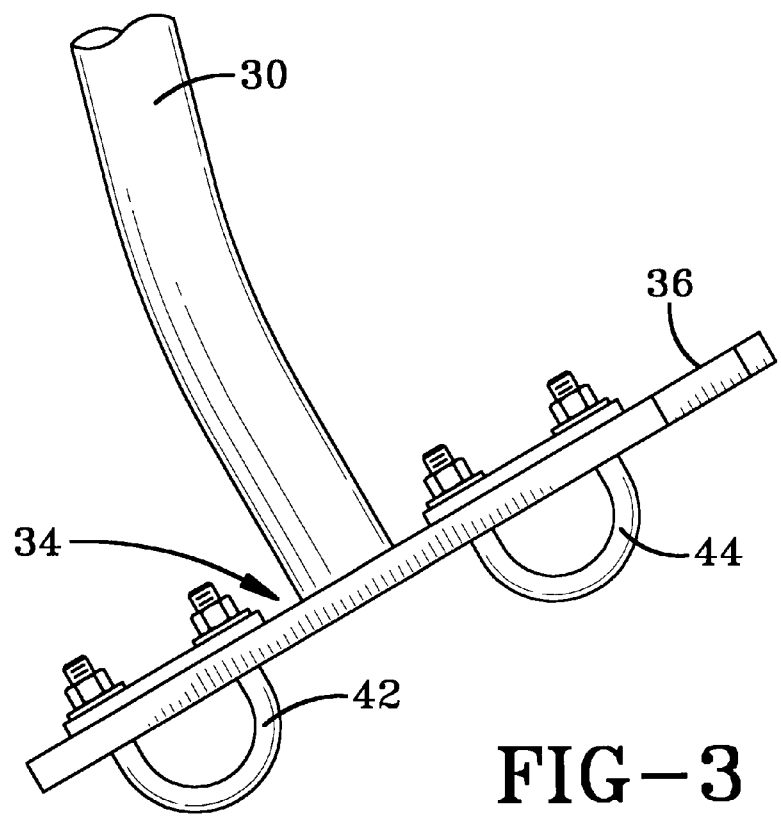
FIG. 3 is a perspective view of a preferred embodiment of two U-bolt closures fitted through the pairs of slots of an attachment flange (the two rear wheel fork bars are not shown)

As shown in FIG. 2, the attachment flange 36 has two pairs of slots 38, 40 which are each adapted to accept a U-bolt closure. Each pair 38, 40 is disposed so as to accord with the position of a respective one of the two rear wheel fork bars 22, 24. Each pair of slots 38, 40 is also arranged such that one slot extends on one side of a respective rear wheel fork bar, and the other slot extends on the other side of the respective rear wheel fork bar. As shown in FIG. 3, the attachment 34 also comprises two U-bolt closures 42, 44. As indicated in FIG. 4, the two U-bolt closures 42, 44 fit through the pairs of slots 38, 40 so as to hold the two rear wheel fork bars 22, 24 against the attachment flange 36.

Figure 4:
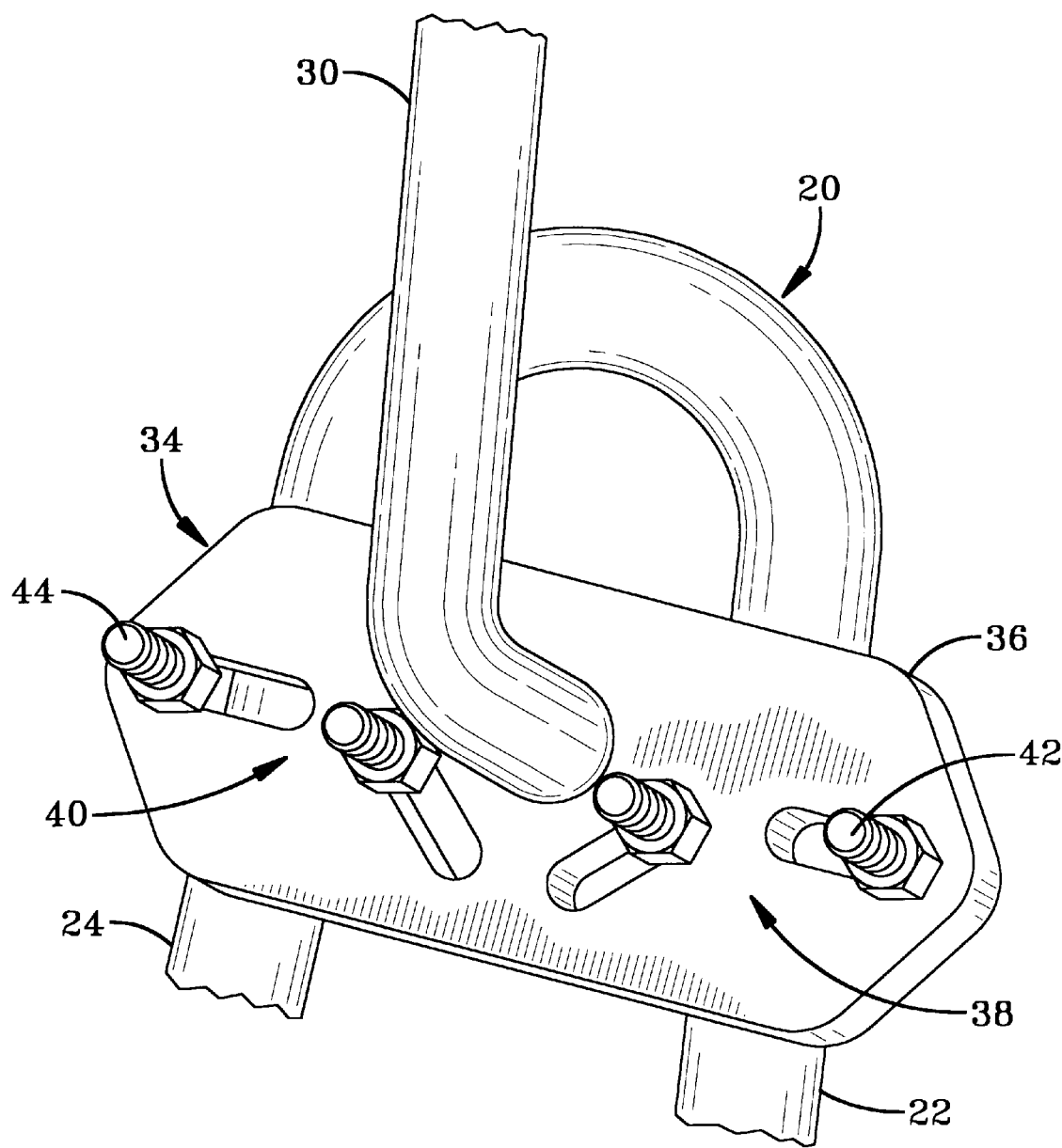
FIG. 4 is a perspective view of a preferred embodiment of a training support bar attached to two rear wheel fork bars by an attachment.

As illustrated in FIGS. 2 and 4, it is preferred that the slots within each of the pairs of slots 38, 40 be disposed at an angle to one another, so as to allow the U-bolt closures 42, 44 to accommodate and tighten upon rear wheel fork bars of varying separation distances. As shown in FIG. 1, it is also preferred that the bicycle 10 have a rear axle 12 and that the handle 32 be disposed above the rear axle 12.

Figure 5:
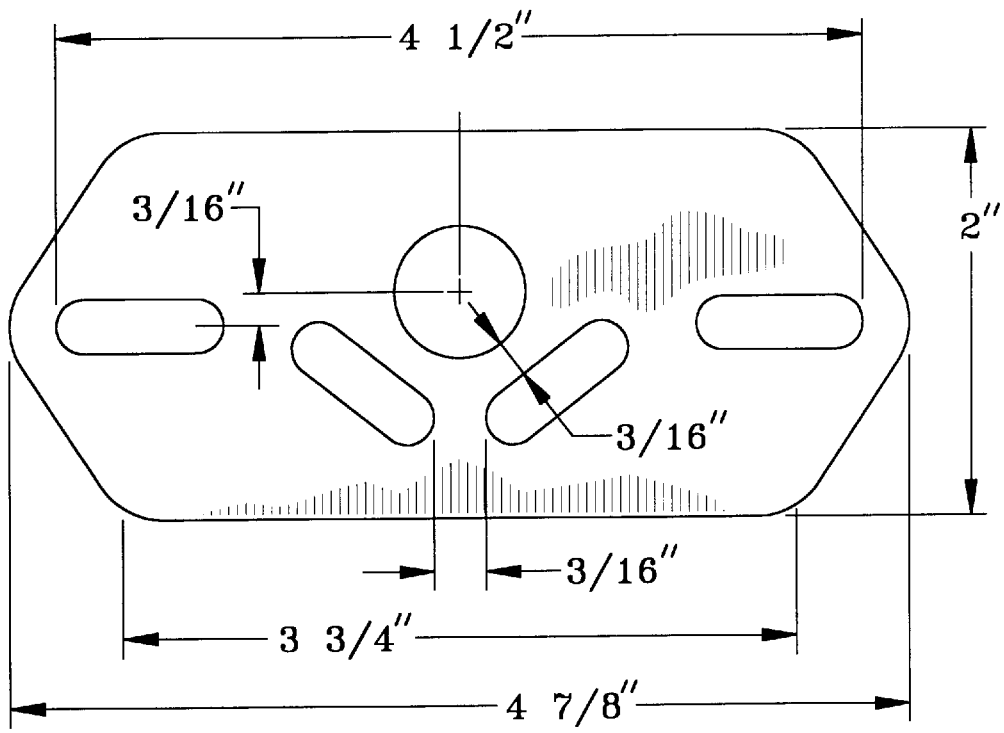
FIG. 5 is a bottom plan view of a preferred embodiment of an attachment flange.

FIG. 5 shows the dimensions of a preferred embodiment of the attachment flange of the present invention. In this embodiment, the attachment flange is substantially symmetrical across the vertical axis. In addition, the hole size is approximately 0.75 inches, the slots are approximately 0.3125 inches by 1 inch, the thickness of the attachment flange is approximately 0.1875 inches, and the attachment flange is made of mild carbon steel.

Figure 6:
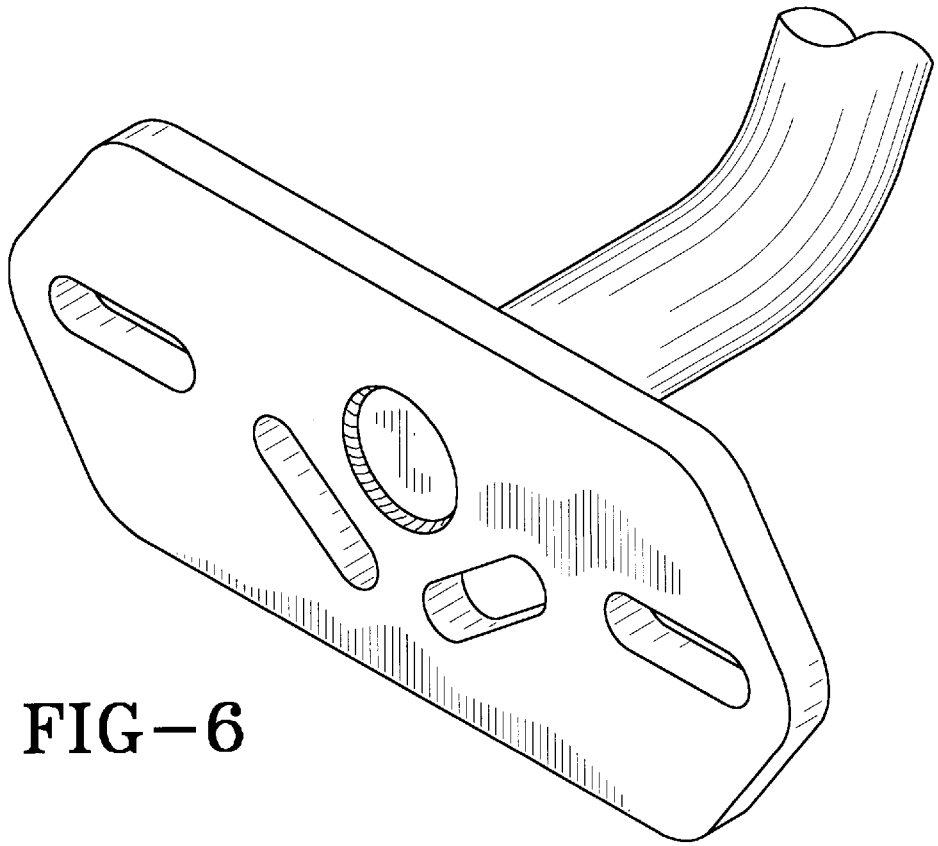
FIG. 6 is a perspective view of a preferred embodiment of the training support device of the present invention.
Figure 7:
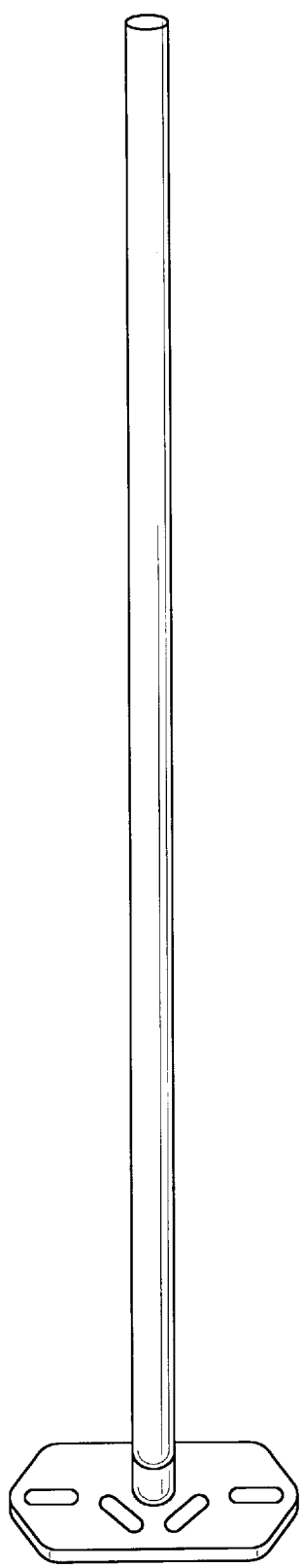
FIG. 7 is a rear elevation view of the training support device shown in FIG. 6.
Figure 8:
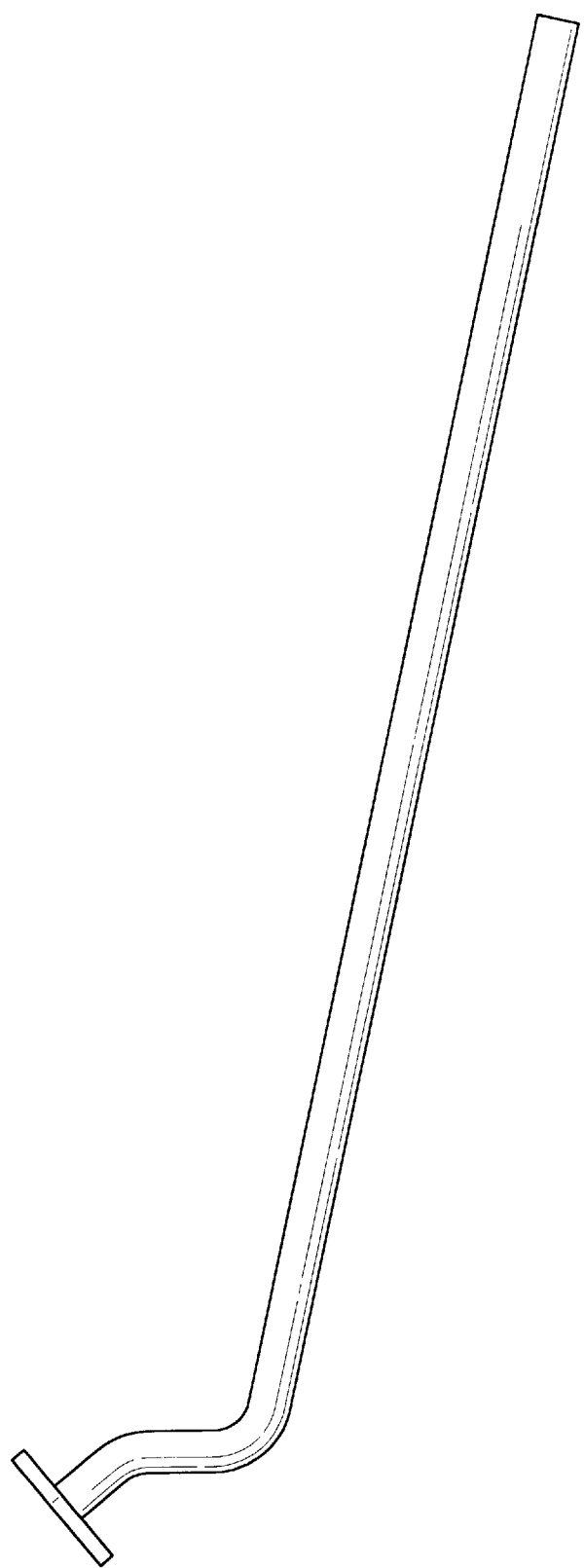
FIG. 8 is a side elevation view of the training support device shown in FIG. 6.

FIGS. 6, 7, and 8 illustrate another embodiment of the training support device of the present invention. In this embodiment, the training support bar is approximately 40 inches long, and it is welded to the attachment flange.

In order to install the training support device of the present invention, the device is clamped to the upper, rear fork of the bicycle frame, just below the rear portion of a standard seat. The training support device's universal mounting plate may be designed to fit on the majority of bike frames most commonly used by children. The slotted holes in the plate provide a range of positions for the two u-bolts which allow the plate to be mounted to both narrow and wide rear forks. Although the mounting plate was designed specifically for most 16" and 20" bicycles, it may also fit on many of the smaller 12" bikes as well. Typical installation steps are as follows:

Step 1—If space is tight, remove any reflectors or caliper brakes that are mounted on the upper rear fork under the seat.

Step 2—Place the clear vinyl frame pads (optional; may be of material such as split polymeric tubing to fit over the frame members) on each side of the bicycle's upper rear fork frame tubes.

Step 3—Position mounting plate on top of frame pads in a manner that will allow the u-bolts to clamp around each side of the upper, rear fork and pass through the slots located on each side of the mounting plate.

Step 4—Insert u-bolts up from the bottom so the curved portion of each u-bolt rests against the padded frame tubing and the nuts will clamp down on the top of the mounting plate.

Step 5—Place flat washer over bolt, followed by lock washer and nut.

Step 6—Tighten all four nuts evenly until bar is secure, and avoid denting the bicycle's frame by avoiding overtightening.

Note: The handle grip used by the trainer should be positioned approximately over the rear axle of the bicycle. The bend in the preferred embodiment of the present invention is bent to accomplish this on the majority of bicycle frames. If the angle of the upper, rear fork on a given bicycle is such that the handle is too far forward or too far back, the bar may be bent or otherwise repositioned using a tube bender or shim between the mounting plate and rear fork to adjust the angle of the bar.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A bicycle bearing a training support device, said bicycle comprising:

(1) a rear wheel fork comprising two rear wheel fork bars; and (2) a training support bar having a handle, said training support bar attached to said two rear wheel fork bars by an attachment comprising:

(a) an attachment flange adapted to engage said two rear wheel fork bars in an attachment position, said attachment flange attached to said training support bar at an attachment point and having two pairs of slots adapted to accept a U-bolt closure, each pair disposed so as to accord with the position of a respective one of said two rear wheel fork bars, each pair of slots arranged such that one slot extends on one side of said respective rear wheel fork bar, and the other slot extends on the other side of said respective rear wheel fork bar; and (b) a U-bolt closure fitted through each of said pairs of slots so as to hold said two rear wheel fork bars against said attachment flange, wherein said slots within each of said pairs of slots are disposed at an angle to one another, so as to allow said U-bolt closures to accommodate and tighten upon rear wheel fork bars of varying separation distances.

2. A bicycle according to claim 1, said bicycle having a rear axle, and wherein said handle is disposed above said rear axle.

\* \* \* \* \*